(12) United States Patent
Cromer et al.

(10) Patent No.: US 7,203,183 B2
(45) Date of Patent: Apr. 10, 2007

(54) ACCESS POINT INITIATED FORCED ROAMING BASED UPON BANDWIDTH

(75) Inventors: Daryl Carvis Cromer, Apex, NC (US); Philip John Jakes, Durham, NC (US); Howard Jeffrey Locker, Cary, NC (US); James Peter Ward, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1129 days.

(21) Appl. No.: 10/180,768

(22) Filed: Jun. 26, 2002

(65) Prior Publication Data

US 2004/0001467 A1 Jan. 1, 2004

(51) Int. Cl.
*H04Q 7/24* (2006.01)

(52) U.S. Cl. ............... 370/338; 370/465; 455/453; 709/232

(58) Field of Classification Search ............... None
See application file for complete search history.

(56) References Cited

U.S. PATENT DOCUMENTS

| | | | |
|---|---|---|---|
| 5,570,366 A | 10/1996 | Baker et al. | 370/85.13 |
| 5,633,888 A | 5/1997 | Stewart | 375/202 |
| 5,768,531 A | 6/1998 | Lin | 395/200.72 |
| 5,809,060 A | 9/1998 | Cafarella et al. | 375/206 |
| 5,818,830 A | 10/1998 | Daane et al. | 370/347 |
| 5,923,702 A | 7/1999 | Brenner et al. | 375/202 |
| 6,067,297 A | 5/2000 | Beach | 370/389 |
| 6,075,812 A | 6/2000 | Cafarella et al. | 375/206 |
| 6,327,254 B1 | 12/2001 | Chuah | 370/328 |
| 6,330,231 B1 | 12/2001 | Bi | 370/328 |
| 6,332,077 B1 | 12/2001 | Wu et al. | 455/432 |
| 6,345,043 B1 | 2/2002 | Hsu | 370/324 |
| 6,353,599 B1 | 3/2002 | Bi et al. | 370/328 |
| 6,891,820 B1 * | 5/2005 | Pham et al. | 370/338 |
| 6,996,086 B2 * | 2/2006 | Wolfe et al. | 370/338 |
| 7,028,097 B2 * | 4/2006 | Bard | 709/232 |
| 7,095,748 B2 * | 8/2006 | Vij et al. | 370/401 |
| 2002/0107026 A1 * | 8/2002 | Agrawal et al. | 455/453 |
| 2004/0203818 A1 * | 10/2004 | Cromer et al. | 455/452.1 |

FOREIGN PATENT DOCUMENTS

| | | |
|---|---|---|
| EP | 0782297 A2 | 7/1997 |
| EP | 0 913 968 A1 | 5/1999 |
| EP | 1 206 069 A1 | 5/2002 |
| WO | 01/06710 A1 | 1/2001 |
| WO | 01/72003 | 9/2001 |
| WO | 01/89153 A2 | 11/2001 |

OTHER PUBLICATIONS

IBM Technical Disclosure Bulletin vol. 36, No. 04, Apr. 1993, "Access to High-Speed LAN via Wireless Media" pp. 59-61.
PCT GB 03/02729 International Search Report, 4 pages.

* cited by examiner

*Primary Examiner*—Phirin Sam
(74) *Attorney, Agent, or Firm*—David R. Irvin

(57) ABSTRACT

Apparatus and method provides dynamic load balancing of network bandwidth between access points in an 802.11 wireless LAN. The access point generates and monitors average bandwidth utilization of client devices connected to said access point. The average bandwidth utilization for each client device is aggregated and selected clients are forced to roam to other access points if the aggregate bandwidth is equal or exceeds a threshold.

17 Claims, 12 Drawing Sheets

Fig 5

| Client 502 | IP Address 504 | Signal Strength (1-10) 506 | Avg Bandwidth (Mbps) 508 | | Force Roam Flag 510 |
|---|---|---|---|---|---|
| 1 | | | | | |
| 2 | | | | | |
| 3 | | | | | |
| n | | | | | |
| | | | | | Aggregate Bandwidth 512 |

500

ACCESS POINT INITIATED FORCED ROAMING BASED UPON BANDWIDTH

CROSS REFERENCE TO RELATED PATENT APPLICATION

Patent application Ser. No. 10/141,148, assigned to the assignee of the present invention and fully incorporated herein, describes an invention that ensures "fairness" by limiting access to users as is necessary under the circumstance.

BACKGROUND OF THE INVENTION

1. Technical Field

This invention relates generally to data communications, and in particular to data communications in a Local Area Network (LAN). Specifically, the invention is directed to managing wireless access to a LAN.

2. Description of the Related Art

The need for personal wireless communications is expanding rapidly with the advances in digital communications and personal communications systems. The progress in wireless radio technology and the growth rate of the wireless telephone systems over the last several years is indicative of tremendous market demand for location independent communication via wireless access. Many of the current wireless networks architectures are primarily designed and optimized for voice communications and wide area coverage. With the proliferation of personal and portable computers, and local area networks, it is envisioned that data services and applications such as file server access, client-server execution, and electronic mail will require wireless access to the LAN environment supporting distributed computing. The use of wireless communication systems to transmit data traffic utilizing mobile devices which communicate with a hardwired network, such as a LAN or a wide area network (WAN), has become widespread. Mobile worker, connected everywhere on campus, increased productivity. Retail stores and warehouses, for example, may use wireless communications systems with mobile data terminals to track inventory and replenish stock. The transportation industry may use such systems at large outdoor storage facilities to keep an accurate account of incoming and outgoing shipments. In manufacturing facilities, such systems are useful for tracking parts, completed products and defects. Since the characteristics and profile of data traffic are very different from those of voice traffic, the wireless access protocol must efficiently accommodate the very dynamic and bursty nature of data traffic.

A typical wireless communications system includes a number of fixed access points (also known as base stations) interconnected by a cable medium often referred to as a system backbone.

Associated with each access point is a geographic cell. The cell is a geographic area in which an access point has sufficient signal strength to transmit data and receive data from a mobile device such as a data terminal or telephone with an acceptable error rate. Typically, access points will be positioned along the backbones such that the combined cell area coverage from each access point provides full coverage of a building or site. In the case of WLAN, frequently there is significant overlaps in cells to increase data capacity. So a user typically has access to several different access point in any given location. The reason for this is that the capacity of the network is a function on number of access points. For 802.11 b, an access point provides 11 Mbps, which is shared by number of users.

Mobile devices such as telephones, pagers, personal digital assistants (PDA's), data terminals etc. are designed to be carried throughout the system from cell to cell. Each mobile device is capable of communicating with the system backbone via wireless communication between the mobile device and an access point to which the mobile device is registered. As the mobile device roams from one cell to another, the mobile device will typically deregister with the access point of the previous cell and register with the access point associated with the new cell.

Recently a standard for wireless local area networks (WLANs) known as the IEEE 802.11 standard has been adopted and has gained acceptance among the industrial, scientific and medical communities. The IEEE 802.11 standard for WLANs is a standard for systems that operate in the 2,400–2,483.5 MHz industrial, scientific and medical (ISM) band. The ISM band is available worldwide and allows unlicenced operation of spread spectrum systems. The IEEE 802.11 RF transmissions use multiple signaling schemes (modulations) at different data rates to deliver a single data packet between wireless systems. The latest IEEE 802.11 wireless LAN uses a band of frequencies near 2.4 Ghz for direct sequence spread spectrum transmissions. Another recently adopted short-range standard has evolved known as the Bluetooth standard (see www.bluetooth.com). The Bluetooth standard is a low-cost short range wireless connection which uses much of the same range of frequencies for its frequency-hopping spread spectrum transmissions as the IEEE 802.11 standard. In some applications, it is appropriate to use systems employing IEEE 802.11 concurrently with other systems using the Bluetooth standard.

In IEEE 802.11 wireless LAN technology, there is a shared transmission medium between the access point and client devices. Since an access point can only be receiving data from one client at a time, a given client can monopolize that channel, effectively reducing throughput available to other clients. So, for example, clients that request bandwidth often, may be granted a disproportionate amount of bandwidth. Accordingly, there is a strong need in the art for a system and method that prevents a single client on the wireless LAN from monopolizing the network bandwidth.

A client device will register with the most convenient Access Point available even though the Access Point may be crowded and there may be equally available uncrowded Access Points to which the client device could easily attach. This in part is due to the fact that the client device registers with an Access Point based upon the Access Point position in the list of Access Points usually preloaded in the client device or signal quality or both. It is desired to have client devices attach to the Access Point that is most likely to afford the best quality of service to attached client devices. This is most likely to happen when client devices are evenly distributed among available Access Points rather than having too many attach to one Access Point and too few to an equally available Access Point. As a consequence there is a need to provide a load balancing mechanism in the Access Point.

SUMMARY OF THE INVENTION

In the case of Wireless LAN (WLAN) to which this invention relates there is significant overlap in cells to increase data capacity. Stated another way, the capacity of a WLAN may be viewed as a function of the number of Access Points available to client. As a consequence a user typically has access to several different Access Points in any given location.

This characteristic of WLANs is used by an Access Point that is congested to transfer servicing of clients to other Access Points equally accessible to the clients. In other words the client is forced to attach to an Access Point different from the one selected by the client pursuant to 802.11 protocols for WLAN. The transfer of clients from one Access Point to another is termed "Forced Roaming".

In particular, connection between a client and Access Point is established in accordance with 802.11 protocols for WLAN. Once connected (either by selecting an Access Point from a table of available Access Points, preference, or strongest quality signal) the Access Point determines if the bandwidth of a client is less than the max bandwidth. The access point starts negotiating, via an algorithm, with other access points to redistribute the client load. This is done by providing a list of MAC address for each client, signal quality, and available bandwidth. If another AP can improve quality of service, the connection is transferred to an alternate access point; the transfer is referred to as forced roaming. This algorithm will be triggered anytime the bandwidth drops below the maximum. The algorithm will also try a reconnect at predetermined time intervals if the bandwidth is still below the maximum. By forcing a client to roam the Access Point ensures there is available bandwidth to service the clients. This is significantly different than typical roaming, which Access Point initiates a switch based on changes in signal quality instead of bandwidth.

Forced roaming increases the efficiency of the WLAN network by dynamically executing load balancing. The dynamic load balancing increases the effective bandwidth of the network in a given geographic area without requiring change to higher bandwidth protocols which are more expensive. The benefit to the user is better network performance with improves productivity.

BRIEF DESCRIPTION OF THE DRAWINGS

The invention as well as a preferred mode of use, further objects and advantages thereof will best be understood by reference to the following detailed description of an illustrative embodiment when read in conjunction with the accompanying drawings, wherein:

FIG. 5 shows a graphical representation of the table provided in and dynamically managed by each Access Point. The table contains information about clients connected to the Access Point.

DESCRIPTION OF THE PREFERRED EMBODIMENT

Figure 1:
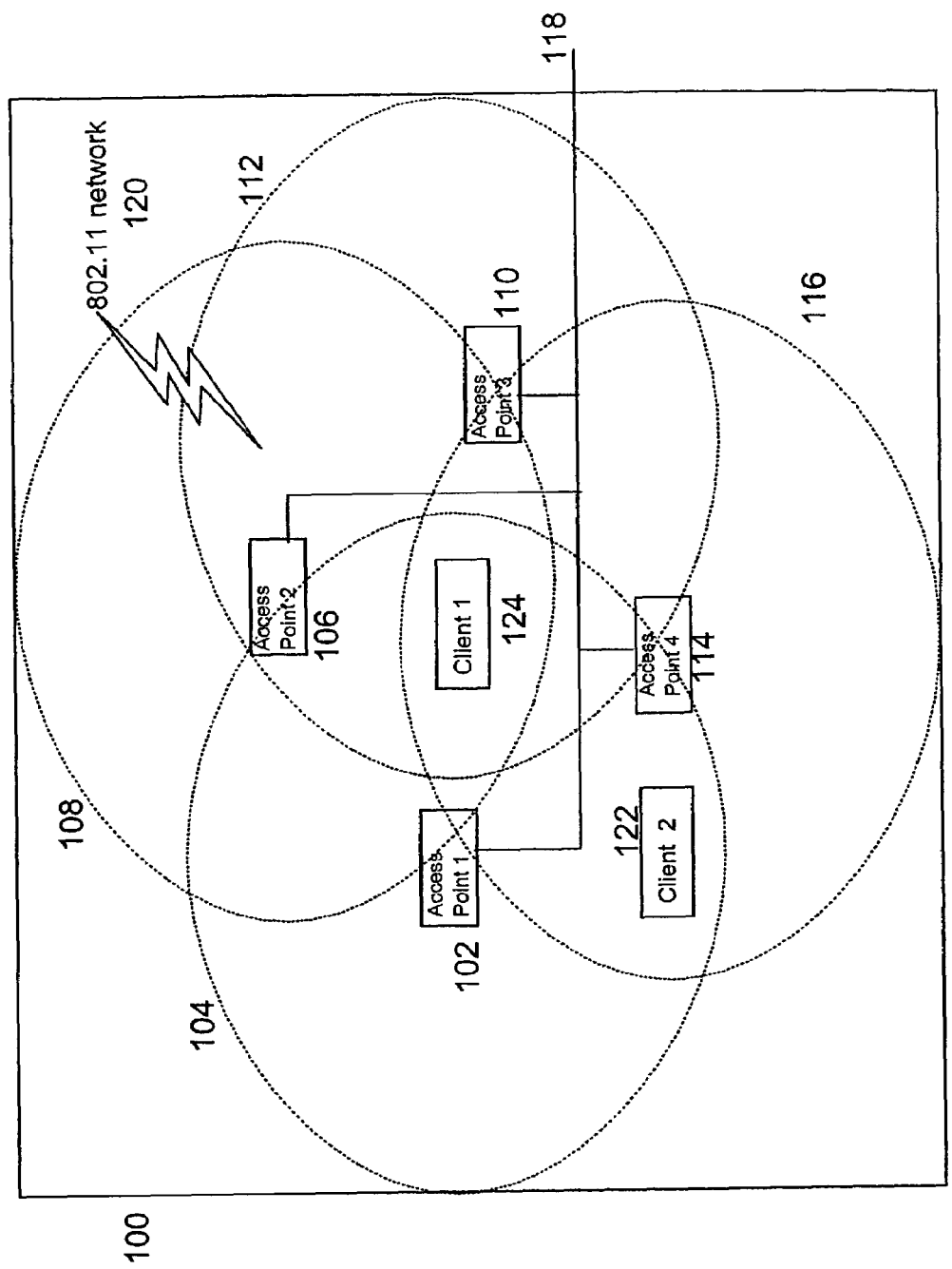
FIG. 1 shows a network for practicing the present invention.

FIG. 1 shows a schematic of a network in which the present invention is used. The network includes 802–11 wireless network 120 and wired network 118. The wired network 118 could be any of the well-known local area networks (LAN), such as ethernet LAN running at 100 Mbps. The wired network 118 is connected to a plurality of servers and the Internet or a company Intranet (not shown). The wireless network 120 is a wireless LAN created by radio frequencies and utilizes protocols set forth in IEEE 802.11 specification for wireless LAN. Access Points 102, 106, 110 and 114 are connected to LAN 118. As will be explained subsequently, each of the Access Points includes a wireless adapter that allows clients such as client 124 and client 122 to communicate with devices on LAN 118 or in the Internet.

Still referring to FIG. 1, each of the Access Points has a range or distance in which it transmits and receives signals. For example, the range for Access Point 102 is 104. Likewise, the range for Access Point 106 is 108. Similarly, the range for Access Point 100 is 112 and that for Access Point 114 is 116. As is seen in the figure, Client 124 is in the range of 4 Access Points and therefore can communicate with any one of them. Client 122 is in the range of two access points 102 and 114, respectively. Therefore, Client 122 can communicate by radio waves to either Access Point 102 or Access Point 114. Once connected to one of the Access Points using protocols set forth in the IEEE 802.11 specification, the client will not attempt to sever the connection even though it has another Access Point to which it is able to communicate and the Access Point to which it is connected is experiencing congestion. The present invention (to be described hereinafter) allows the Access Point to transfer the connection to the less-congested Access Point thus forcing the client to roam.

Figure 2:
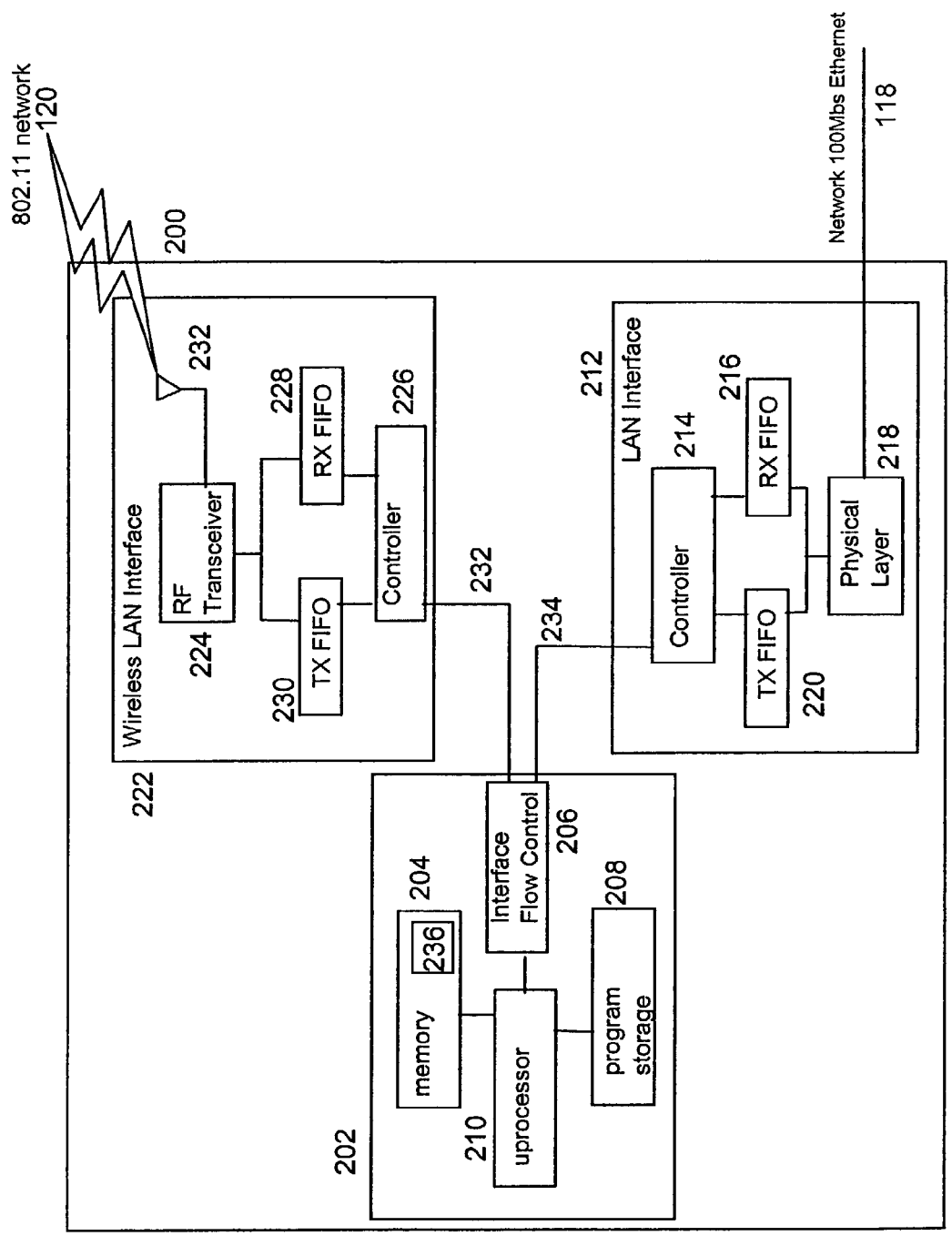
FIG. 2 shows a block diagram of the Access Point according to the teachings of the present invention.

FIG. 2 shows a block diagram of the Access Point (AP) according to the teachings of the present invention. Elements in FIG. 2 that are similar to elements in FIG. 1 are identified with like numerals and will not be discussed further. It should be noted that the Access Points in FIG. 1 are identical and the FIG. 2 diagram and description are intended to cover any one of the Access Points in FIG. 1. The Access Point 200 includes controller 202, wireless LAN adapter 222 and wired LAN adapter 212. The wireless LAN adapter 222 provides a wireless LAN interface to controller 202 whereas wired LAN adapter 212 provides a LAN interface to the ethernet LAN. The controller 202 is coupled by bus 232 to wireless LAN adapter 222 and by bus 234 to wired LAN adapter 212. The controller 202 includes memory 204, interface control logic 206, program storage 208, and microprocessor 210. The named components 204, 206, 208 and 210 are interconnected as shown in FIG. 2. The program storage 208 stores control program (firmware) that microprocessor 210 runs or executes to support the wired and wireless network. The data store 204 is used to temporarily holds data that is being transferred between wireless network 120 and the wired network 118. Data storage 204 also contains control table 236 (described hereinafter) that is updated dynamically and is used by the Access Point to force a client to connect to another Access Point. The interface flow control logic 206 controls the movement of data from controller 202 to the wireless adapter 222 and to wired adapter 212.

The LAN adapter 212 provides the LAN interface to ethernet LAN 118. Wired LAN adapter 212 includes Controller 214, TX FIFO 220, RX FIFO 216 and Physical Layer 218. Controller 214 provides MAC (medium access control) function to the LAN adapter. Controller 214 is connected to TX FIFO 220 and RX FIFO 216. The TX FIFO 220 holds data to be transmitted onto the ethernet LAN whereas the RX FIFO 216 receives data from ethernet LAN 118. TX FIFO 220 and RX FIFO 216 are connected to Physical Layer 218. The Physical Layer 218 provides physical function to the adapter which includes conversion of digital to analog signals compliant with ethernet specification provides physical connection to network 118, etc.

Still referring to FIG. 2, wireless LAN adapter 222 is designed to run protocols specified by IEEE 802.11 b wireless LAN specification. The wireless LAN adapter 222 includes RF Transceiver 224, TX FIFO 230, RX FIFO 228 and Controller 226. The named components are connected as shown in the figure. The Controller 226 provides interface function and is commonly known as medium access control (MAC). The MAC is connected to the TX FIFO 230 which holds data to be subsequently transmitted to the wireless network. Likewise, the RX FIFO 228 holds data that is received from the wireless network. The RF Transceiver 224 is connected to amplifier and antenna 232 which converts digital signals to radio frequency energy compliant with 802.11 b specification. The RF Transceiver also receives radio frequency signals and converts them to digital signals. As a consequence the RF Transceiver includes both a transmitting subsystem and a receiver subsystem. The transmitting subsystem handles data which is transmitted into the wireless network whereas the receiving subsystem manages data received from the wireless network. RF transceivers are well known in the prior art and further discussions are not warranted.

Figure 3:
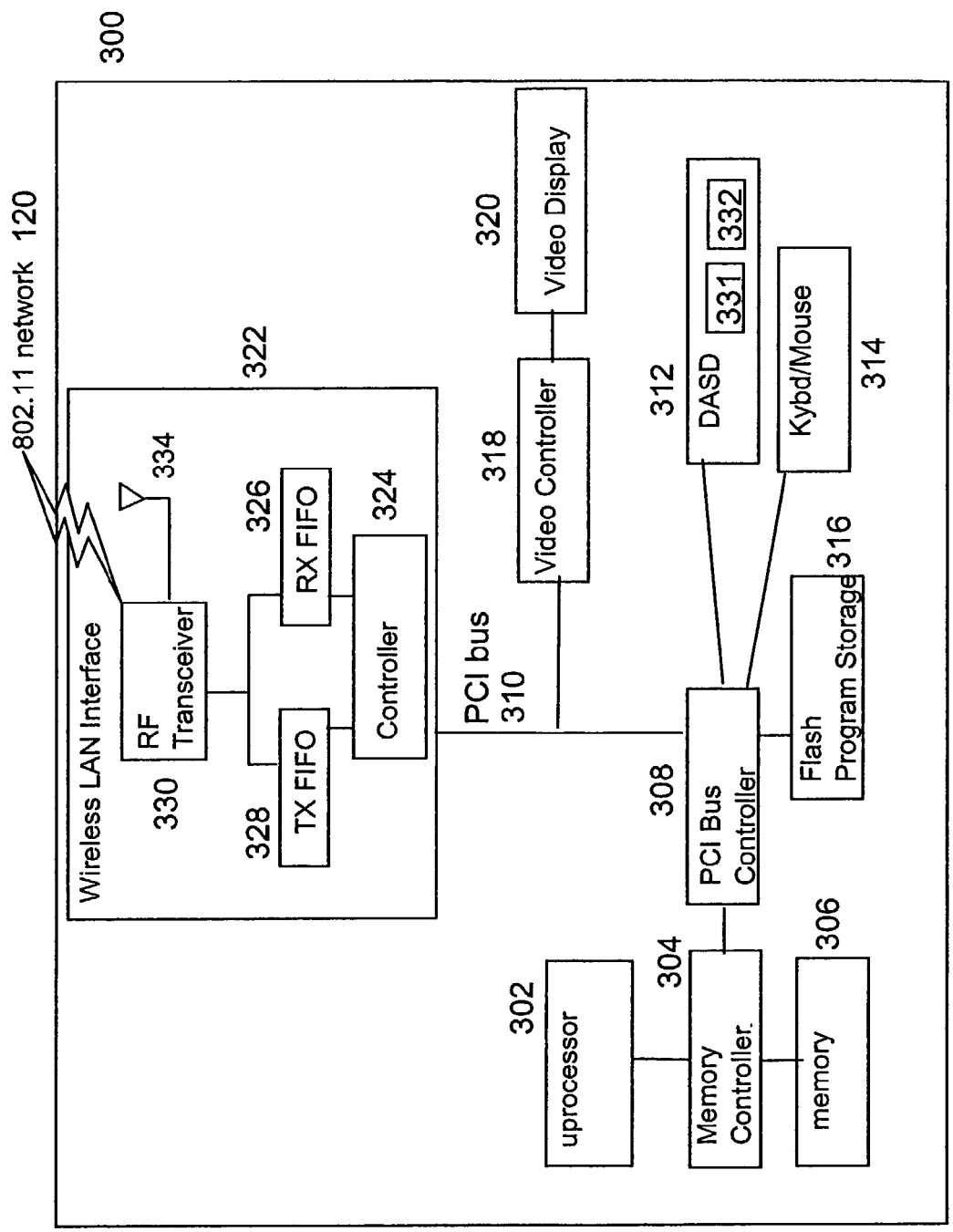
FIG. 3 shows a block diagram of the client according to the teachings of the present invention.

FIG. 3 shows a block diagram of the structure for a client device. The client 300 includes peripheral component interface (PCI) bus controller 308 to which DASD 312, keyboard/mouse 314, flash program storage 316 and memory controller 304 are connected. The function of PCI bus controller 308 includes arbitrating between the attached devices and enabling those devices to access the microprocessor 302 and its memory 306. The microprocessor 302 is coupled through the memory controller 304 to the memory 306. The memory controller 304 controls the memory 306. The flash program storage 316 contains initialization program or BIOS that is used to establish the client in an operating state when it is first turned on. An area of DASD 312 is used to contain the preference list 332 that defines which Access Point a client device attempts to connect to. The preference list 332 could contain specify (any) Access Point or have a list of several "allowable access points" to which the client can attach. Usually, system administrators typically define the preference list which is placed on a machine prior to being given to a user.

Still referring to FIG. 3, area in DASD also contains a table termed "Forced Roam Table" 331 whose contents is set by an Access Point when a client is forced to connect to another access point due to congestion in the access point to which it was connected. PCI expansion bus 310 connects video controller 318 and wireless adapter 322 to the PCI bus controller 308. The video controller 318 is connected to a video display 320. The video controller 318 manages the information to be displayed on the video display 320. The wireless adapter 322 provides the wireless LAN interface that allows a client to communicate via radio waves to an Access Point. As a consequence, the wireless adapter 322 includes RF Transceiver 330 which is connected to TX FIFO 328 and RX FIFO 326. Controller 324 couples TX FIFO 328 and RX FIFO 326 to the PCI bus 310. RF Transceiver 330 is also connected to power amplifier and antenna 334. The Controller 324 performs the MAC functions that allow the wireless adapter 322 to interface with the PCI bus and process data according to the protocols set forth in IEEE 802.11 standard for wireless network. The RF Transceiver 330 includes both the transmitting section and a receiving section that function in a way similar to that of previously described RF Transceiver 224.

Having described the physical structure of the Access Point and the client device, the programs that are executed in each one to allow forced roaming will now be described.

Figure 4:
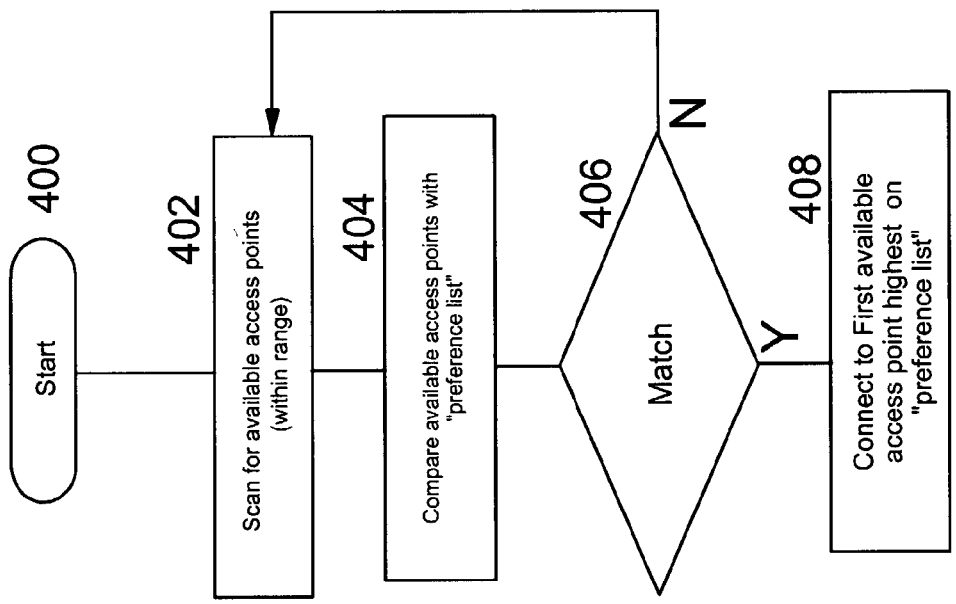
FIG. 4 shows a flowchart of a program executed in the client to establish a connection to an Access Point.

FIG. 4 shows a flowchart for a program executed on the client to establish a connection to an Access Point. Establishing the connection starts at 400 and descends into 402 whereat the wireless LAN interface scans looking for wireless network or available access points. This can be accomplished by having the client device listen for a beacon from access points or having the client device attempt to ping access points in various networks. After determining which access points are within range, the program compares the available access points to access point preference list 332 (FIG. 2) in block 404. The program then descends into 406 where the program loops back to 402 if a match is not found to repeat the previously described steps or descends into 408, if a match is found, where the client connects to first available access point highest on the preference list. It should be noted that the client device does not take into account load balancing of users on access points. For example, if the client device could connect to two different access points the client device will connect to the access point highest on the list without regard to load or congestions at the access point to which it connects.

FIG. 5 shows a graphical representation of Table 500 which is dynamically maintained by each access point and is stored in access point memory 204 as control table 236 (FIG. 2). Table 500 stores information relative to each client device that is connected to the Access Point. In column 502 the name, such as 1,2,3.n, assigned to each client is listed in the table. In column 504 the Internet protocol (IP) address assigned to each client device is recorded. In column 506 the signal strength that is reported from each client is kept. For simplicity, the strength is normalized as percentage for full strength. Column 508 is where the access point stores the average bandwidth used by each client. The average bandwidth that is used by each client is dynamically calculated by the access point for each client. 512 stores the aggregate bandwidth which is the sum of all the bandwidth used by each client. 510 is the force roam flag location which is set when the aggregate bandwidth in 512 exceeds a predetermined threshold. It is the setting of this flag that causes an access point to interrogate adjoining access points to see if it can offload client devices to other access points.

Figure 6:
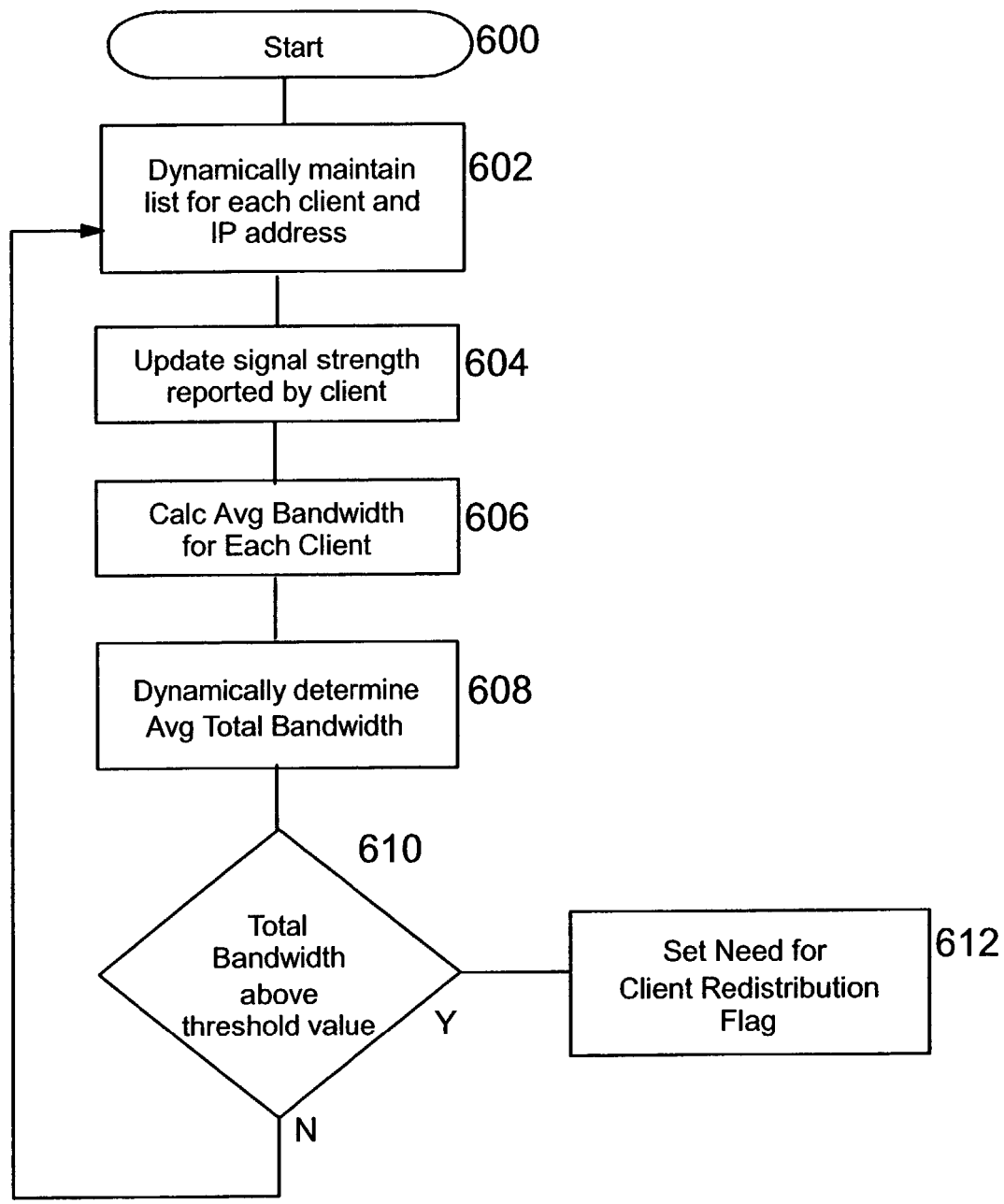
FIG. 6 shows a flowchart of a program executed in the Access Point to monitor Bandwidth Utilization.

FIG. 6 shows a flowchart for a program running in the access point to monitor bandwidth utilization. The program starts in 600 and descends into 602 whereat a record for each client listing the client's identity and IP address is inserted in the appropriate column of FIG. 5. As stated previously, the client device is assigned an identifier and associated IP address which is stored in Table 500 in location 502 and 504, respectively. The program descends into 604 whereat normalized signal strength the client device sends to the access point stored in location 506 of Table 500 is updated. The client device is modified such that it would periodically send out normalized signal strength.

The device driver on the client device is modified such that it reports signal strength to the access point that it's associated with. The device driver reads the signal strength information from wireless LAN interface subsystems and then provides that information to the access points in a control packet. The format of the control packet is a datagram which is a broadcast to access points and contains client device IP address, packet type identification, and signal strength. The device driver sends this information periodically to access point—which set to range from 1–60 minutes. Although not shown in FIG. 3, device drivers and OS are well known to those skilled in the art. Therefore, further discussion is not warranted.

The program then descends into block 606 whereat the access point stores a calculated average bandwidth for each client device that is listed in the table. The access point determines the average bandwidth by determining number of bytes of information sent and received over an interval of time. Specifically, the access point runs a background program where it dynamically determines this information for each client. The average bandwidth is stored in Table 500 at location 508. The program then descends into 608 whereat the access point determines aggregate bandwidth, consumed in the access point by summing the average bandwidth for each client which is also stored in Table 500 at location 512. The program then descends into 610 whereat the aggregate bandwidth is compared against a threshold value. If the aggregate bandwidth is equal or above the threshold the program enters block 612 where it sets the redistribution flag at location 510 in Table 500. If in 610 the total bandwidth is less than the threshold the program loops back to 602. It should be noted that the threshold value used in 610 is determined by a network administrator and should be set to allow for extra capacity on the network to handle burst in client's activity.

Figure 7:
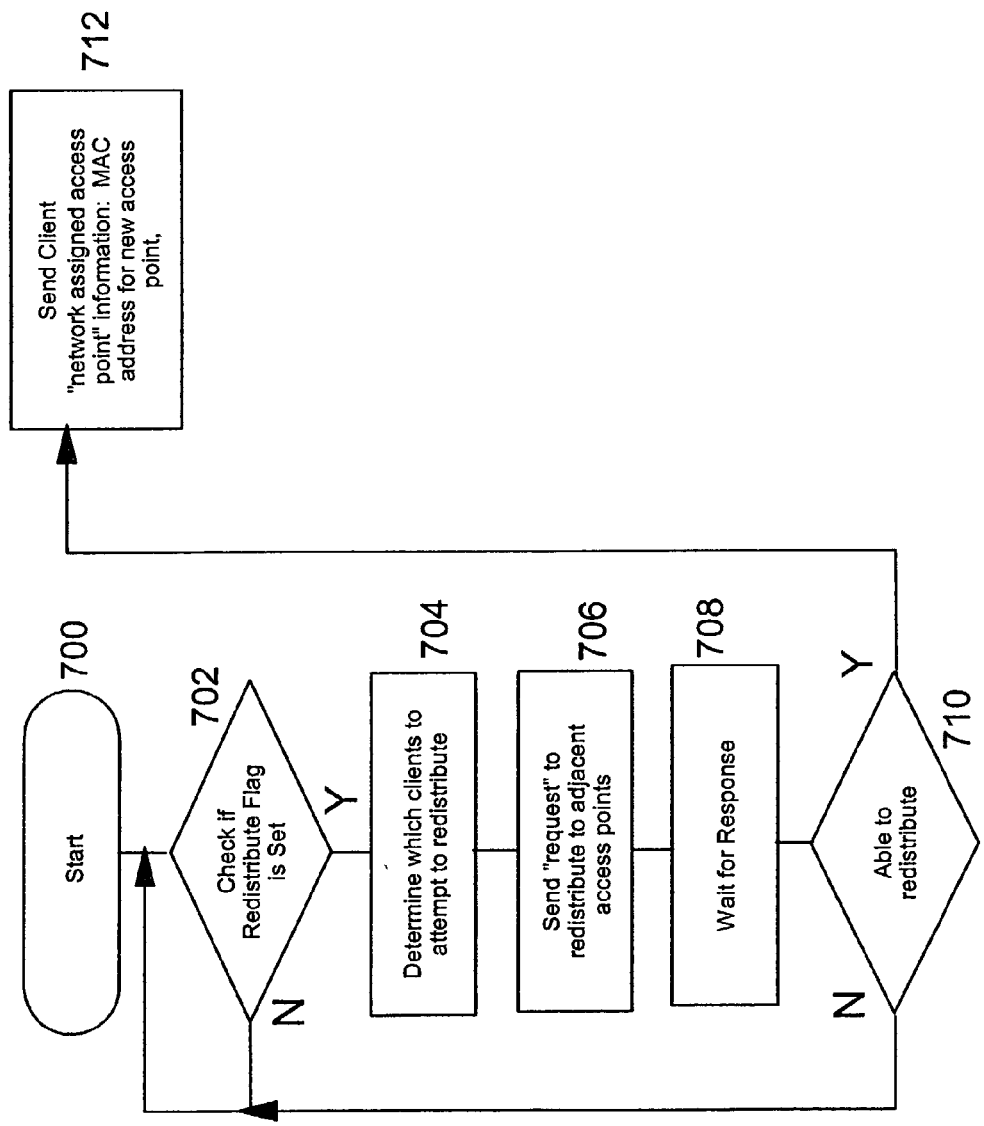
FIG. 7 shows a flowchart of a program executed in the Access Point to manage client redistribution.
Figure 10:
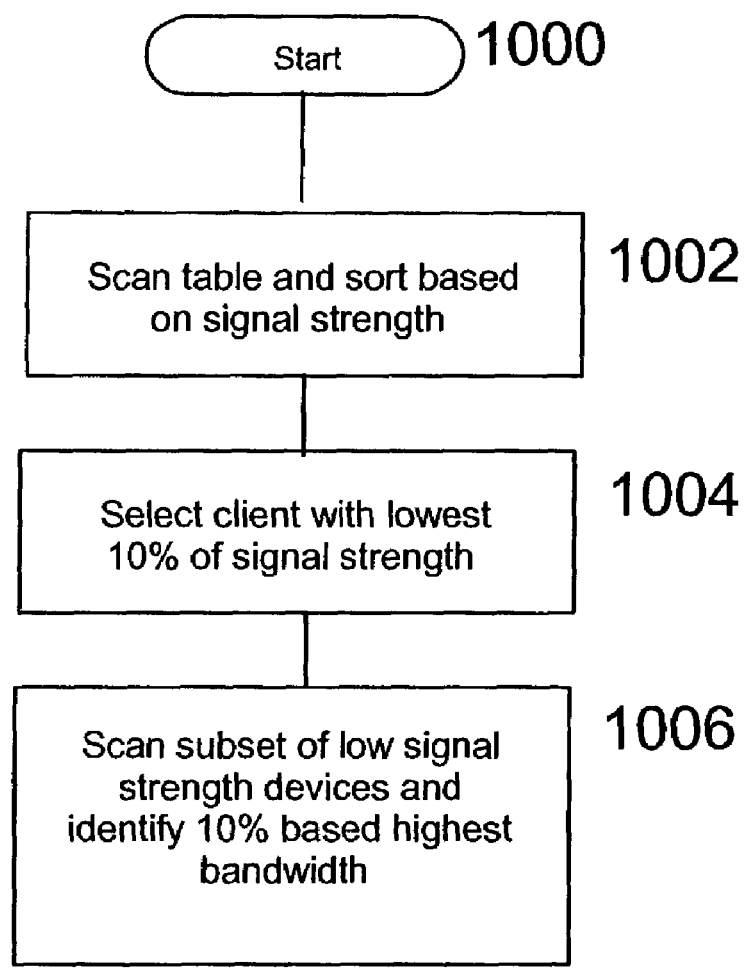
FIG. 10 shows a flowchart of an algorithm executed on the Access Point to determine which client needs to be moved to reduce congestion.

FIG. 7 shows a flowchart of a program executed in the access point to manage client redistribution. This code could be executed on each access point in the system. Alternately, the code could be executed in a single master access point for the entire system or on a server in the network. The program starts in 700 and descends into 702 whereat the program tests if redistribution flag 510 is set in Table 500 (FIG. 5). If the flag is not set the program continues to loop until the flag is set and the program exits along the Y path into 704 whereat the program decides which client to attempt to redistribute. To make this determination the access point executes an algorithm against each client in Table 500. The algorithm is designed to identify which clients need to be moved to reduce aggregate bandwidth below the threshold. The algorithm is also designed to attempt to move a combination of high and low bandwidth devices. A flowchart of the algorithm is shown in FIG. 10 and described hereinafter.

From 704 the program descends into 706 whereat a Request to Redistribute message is sent to adjacent access points. The message contains, among other things, the contents of Table 500 for the identified clients or client. The program then descends into 708 where it waits for a response. The program then descends into 710 where it checks the response. If the response is positive the program exits along the Y path into block 712 whereat the access point sends the client network assigned access point information including MAC address for the new access point. The information is stored in the Forced Roam Table 331 (FIG. 3) of the Client device. If in block 710 the response is negative, the program loops back to 702 and repeats the previously described process steps.

Figure 8:
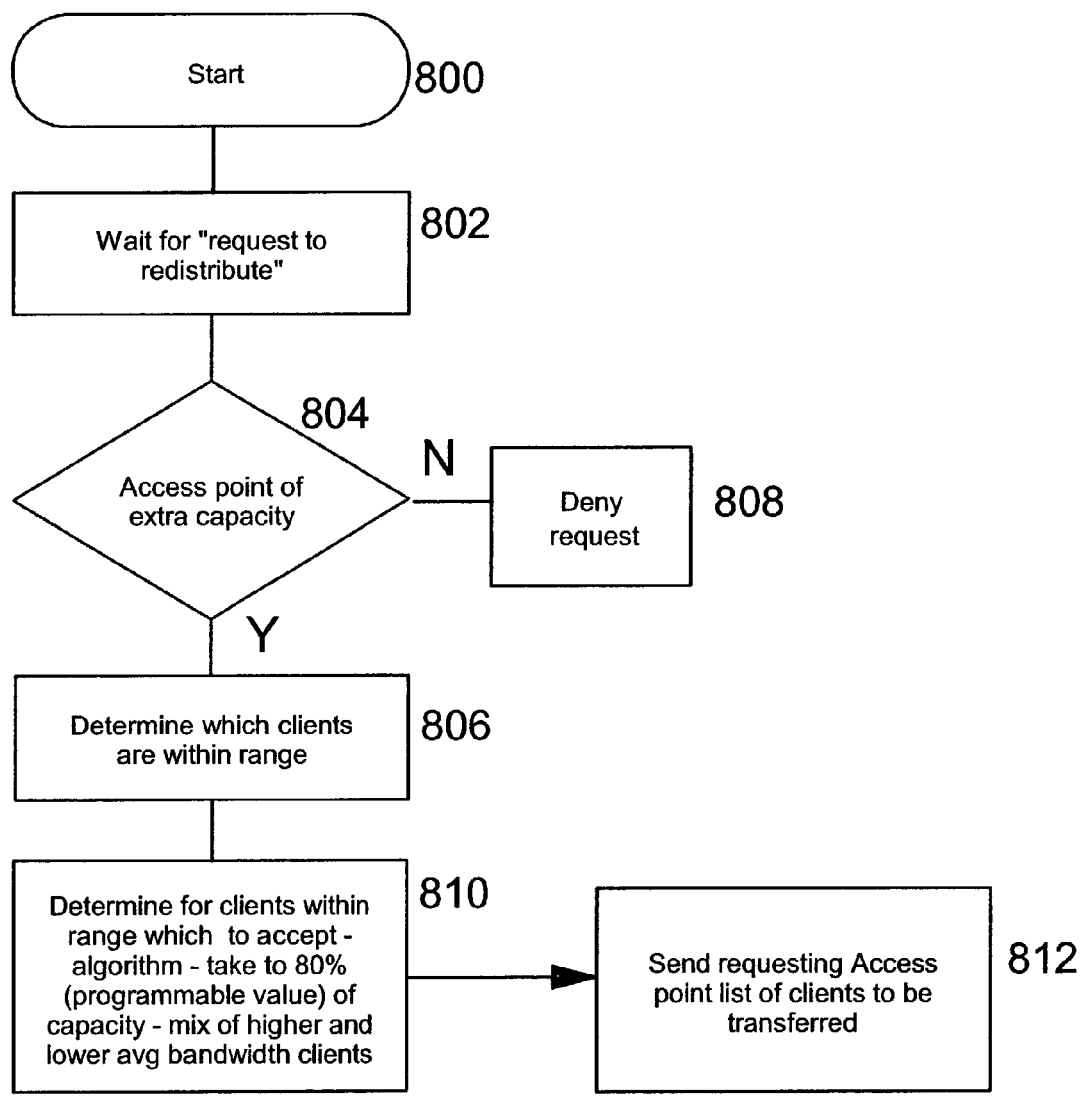
FIG. 8 shows a flowchart of a program executed in the Access Point to monitor redistribution requests and issuing redistribution response.
Figure 11:
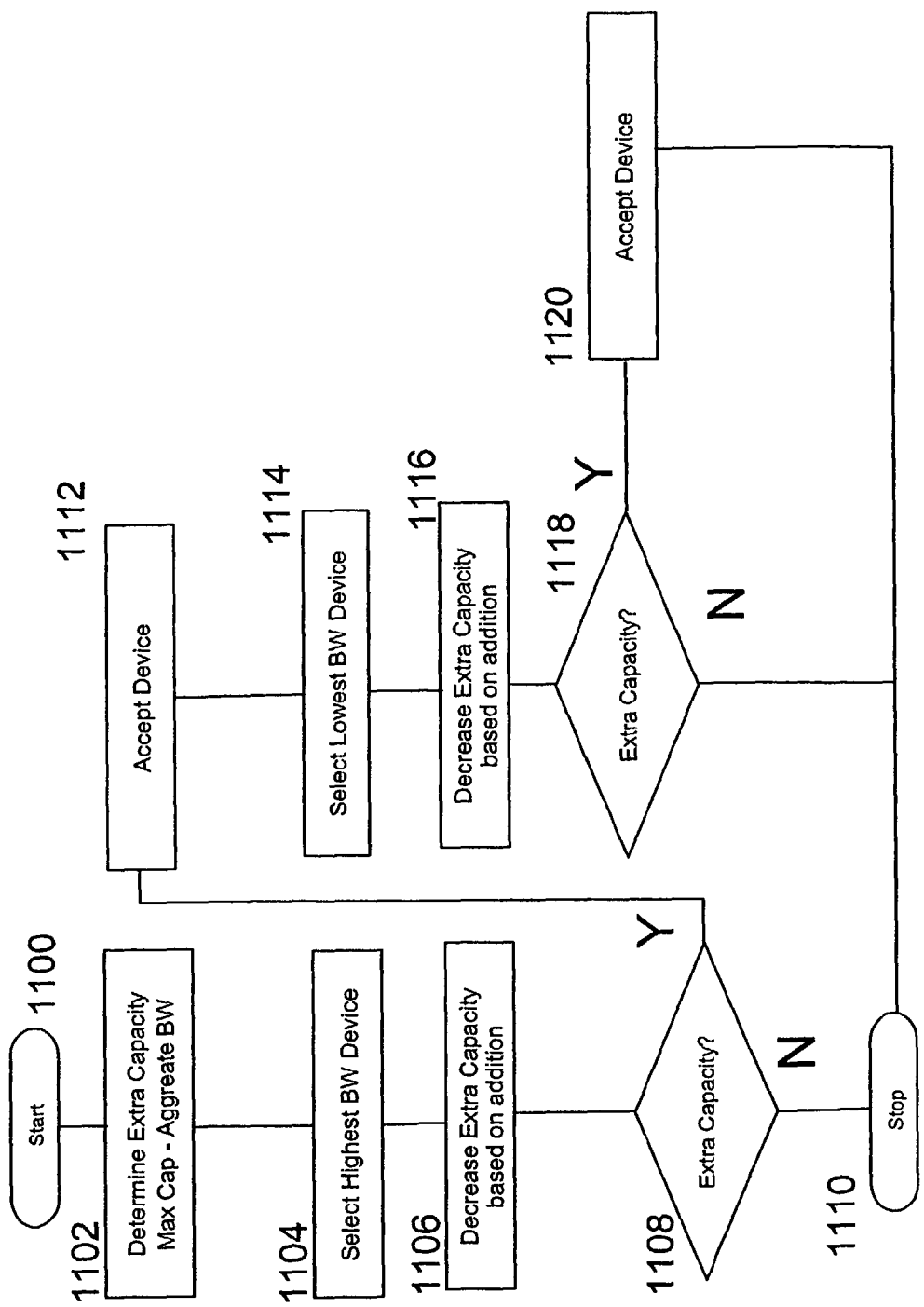
FIG. 11 shows a flowchart of an algorithm executed on the Access Point to determine which client the Access Point can accept.

FIG. 8 shows a flowchart of a program, executed in the access point, that monitors and responds to requests for redistribution. The program starts in 800 and descends into 802 where it waits to receive a request to redistribute. The program then descends into block 804 when it does receive a request to redistribute. In 804 the program tests if it has extra capacity. This is done by checking the aggregate bandwidth 512 in Table 500 for that access point. If there is no additional bandwidth the request is denied in block 808. If there is extra capacity the program descends into 806 whereat the access point must determine which client devices are within range. This is accomplished by the access point listening to devices that are transmitting data. The program then descends into 810 whereat the access point determines which client device it can accept. This requires running an algorithm to determine which clients can be moved without overtaxing the access point capacity. FIG. 11 (described hereinafter) is a flowchart of the algorithm.

After determining which clients the Access Point can accept a response message listing the name of the client that the Access Point can accept 812 is sent to the requesting Access Point.

Figure 9:
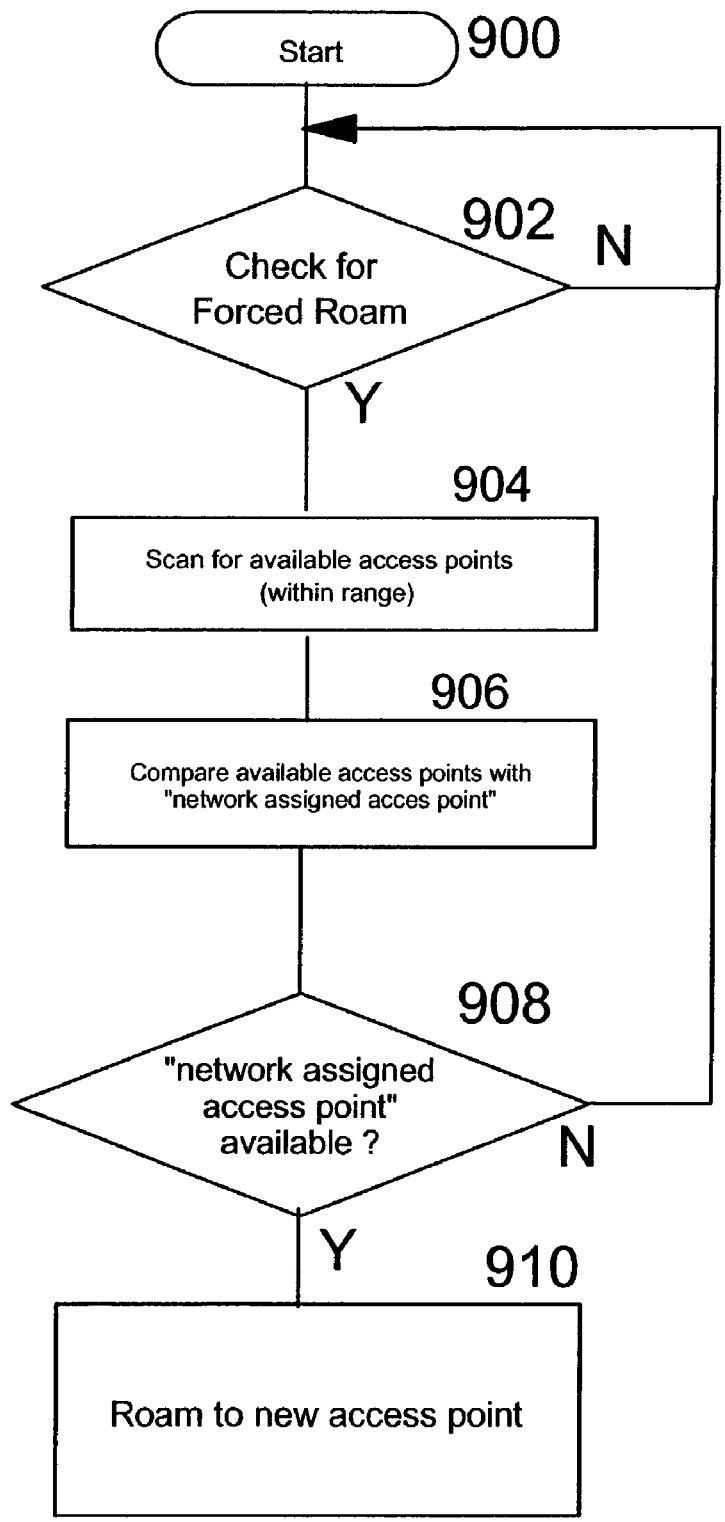
FIG. 9 shows a flowchart of a program executed in the client to check for forced roam command.

FIG. 9 shows a flowchart for a program that is executed in the client to check for force roaming. The program starts in 900 and descends into 902 whereat it checks for force roaming. This is done by the client examining a bit set in table (331) in the client illustrated in FIG. 3.

If force roaming is not activated the program loops. If force roaming is activated the program exits along the Yes path into 904 whereat the client device first scans to determine the available access points in range. It then compares the available access points to the specific access point assigned in network 906.

If the access point is not available the program loops. If the access point is available the program exits 908 along the Yes path into 910 whereat the client establishes a link with the access point to which it is forced.

FIG. 10 is a flowchart for a program executed on the Access Point to identify the client/clients to be removed to control congestion. The algorithm starts at 1000 and descends to 1002 whereat the table 502 is scanned and sorted based on signal strength of the devices. Subsequently in step 1004 the client devices with low signal strength (in this case lower 10%) are selected as candidates to force roam since these devices given lower signal strength are most likely to have errors in transmissions resulting in retries. In step 1006, 10% of devices with highest bandwidth in the subset of lower signal strength are selected.

FIG. 11 is a flowchart for an algorithm executed on the Access Point to determine which client the Access Point can accept. Starting in 1100 flow descends to 1002 whereat the extra capacity is determined by difference between the Max. Capacity and the aggreate capacity 512. In step 1104 of devices within range (check in step 806) the highest bandwith device is selected and the extra capacity is decrease based on this addition in step 1106. In step 1108 a determination if adding this device exceed the capacity of the access point. If capacity is exceed flow is stopped in 1110. If extra capacity remains the device is accepted in 1112. The next device selected is the lowest bandwidth device 1114, extra capacity is decreased in 1116, check of available capacity occurs in 1118, and if capacity is available then is accepted in 1120. The method is setup to alternate between high capacity and low capacity devices.

Figure 12:
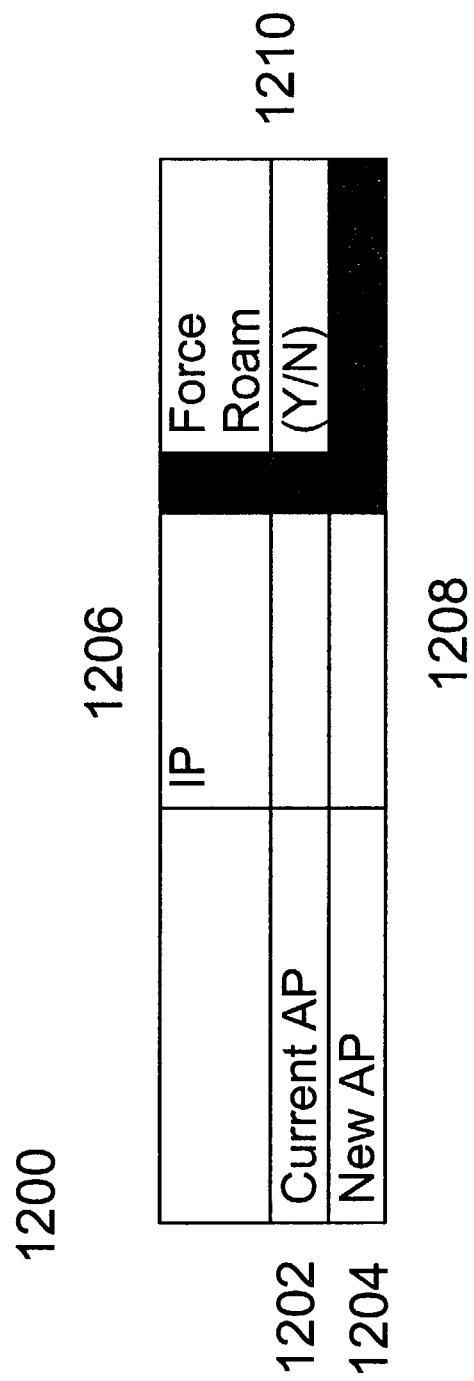
FIG. 12 shows a graphical representation of the Forced Roam Table provided in the client device. The table is written into by the Access Point.

FIG. 12 shows a graphical representation of the Forced Roam Table provided in a client device to accept forced roam information from an Access Point. Table 1200 includes entries for current access point 1202 and new access point assigned by forced roaming 1204. For each access point the associated IP addresses are maintained in 1206 and 1208 respectively. When the client device is instructed to roam a flag is set in 1210 to indicate need to force roam.

The foregoing is illustrative of the present invention and is not to be construed as limiting thereof. Although exemplary embodiments of this invention have been described, those skilled in the art would readily appreciate that many modifications are possible in the exemplary embodiments without materially departing from the novel teaching and advanced use of this invention. Accordingly, all modifications are intended to be included within the scope of this invention as defined in the claims.

What is claimed is:

1. A method to load balance traffic in a communications network including the acts of:
   dynamically generating and maintaining, in an Access Point, a table which lists, among other things, average bandwidth used by each client device associated with said Access Point, identification for each client device, IP address assigned to each client device, signal strength for each client device, a sub-field in which aggregate bandwidth usage is recorded, and a flag which is activated if aggregate bandwidth usage at said Access Point exceeds a predetermined threshold;
   monitoring in said table bandwidth usage of each of the client devices; and
   forcing at least one client to disconnect from said Access Point if aggregate bandwidth usage at said Access Point exceeds the predetermined threshold.

2. The method of claim 1 wherein the signal strength is normalized for each client device.

3. The method of claim 1 wherein the monitoring act further includes summing the bandwidth usage of the client devices to generate aggregate bandwidth usage.

4. The method of claim 3 further including the act of activating a Force Roam Flag if the aggregate bandwidth usage exceeds the predetermined threshold.

5. The method of claim 4 wherein the predetermined threshold is set to allow for extra capacity on the network to handle bursts in client device activity.

6. The method of claim 1 wherein the forcing act further includes determining the at least one client to disconnect; generating a Request to redistribute packet; and forwarding the Request to redistribute packet to at least one Access Point.

7. The method of claim 6 wherein the Request to redistribute packet includes identity, IP address, signal strength and average bandwidth usage of the at least one client.

8. The method of claim 7 further including the acts of receiving a response packet to the Request to redistribute packet; analyzing the response packet; and informing the at least one client to force roam if the response packet indicates the at least one Access Point accepts the Request to redistribute.

9. The method of claim 1 further including the acts of receiving in said Access Point a Request to redistribute packet; determining if said Access Point has excess capacity; and accepting the request if said Access Point has excess capacity.

10. The method of claim 9 further including the acts of determining if client devices identified in the Request to Redistribute packet are within range of said Access Point; and determining if said Access Point can accept the client devices.

11. The method of claim 10 further including the acts of generating an accept response packet if both conditions are positive; and transmitting the accept response packet.

12. The method of claim 1 further including the acts of receiving in said Access Point a Request to Redistribute packet; determining if said Access Point has excess capacity; and denying the request if said Access Point does not have excess capacity.

13. A device including:
   a controller comprising a programmable processor, a memory operatively coupled to said processor, a program storage containing firmware with instructions allowing the processor to execute programs to support wired and wireless LANs, and an interface flow controller coupling said processor to first bus and a second bus; said memory comprising a table partitioned into a first sub-field in which identities of client devices communicating with said device are recorded, a second sub-field to record IP addresses of said client devices, a third sub-field to record signal strength information for said client devices, a fourth sub-field to record average bandwidth utilization for each of the client devices, and fifth sub-field to record aggregate bandwidth utilization;
   a first adapter providing an interface to a wireless LAN; and
   a second adapter providing an interface to a wired LAN;
   wherein the first bus interconnects the first adapter to the controller; and
   wherein the second bus interconnects the controller to the second adapter, wherein said controller executes at least one program that forces a client device to roam if the bandwidth utilization in said device exceeds a predetermined threshold.

14. The device of claim 13 further including an indicia to indicate status of bandwidth utilization in said device.

15. The device of claim 13 wherein the first adapter includes an RF transducer;
   a first FIFO operatively coupled to said RF transducer;
   a second FIFO operatively coupled to said RF transducer; and
   a controller operating in accordance with IEEE 802.11b Wireless LAN specification operatively coupled to the TX FIFO and RX FIFO.

16. The device of claim 13 wherein the second adapter includes a physical layer coupling said second adapter to a wired LAN;
   a TX FIFO operatively coupled to the physical layer;
   an RX FIFO operatively couple to the physical layer; and
   a Medium Access Controller (MAC) operating in accordance with a protocol specification for a wired LAN operatively coupled to the RX FIFO and TX FIFO.

17. The device of claim 16 wherein the protocol specification for a wired LAN includes the IEEE 802.3 ethernet specification.

* * * * *